United States Patent
Parsania et al.

(10) Patent No.: US 7,541,714 B2
(45) Date of Patent: Jun. 2, 2009

(54) STREAMLINED BODY WEDGE BLOCKS AND METHOD FOR ENHANCED COOLING OF GENERATOR ROTOR

(75) Inventors: Nishant Parsania, Bangalore (IN); Samir A. Salamah, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 449 days.

(21) Appl. No.: 11/397,566

(22) Filed: Apr. 5, 2006

(65) Prior Publication Data

US 2007/0236100 A1 Oct. 11, 2007

(51) Int. Cl.
*H02K 3/46* (2006.01)

(52) U.S. Cl. ................ 310/270; 310/214

(58) Field of Classification Search .......... 310/52, 310/58, 61, 65, 214, 270
See application file for complete search history.

(56) References Cited

U.S. PATENT DOCUMENTS

| | | | |
|---|---|---|---|
| 4,656,382 A * | 4/1987 | Moore et al. | 310/270 |
| 6,194,807 B1 * | 2/2001 | Kaminski et al. | 310/270 |
| 6,392,326 B1 | 5/2002 | Turnbull et al. | |
| 6,417,586 B1 | 7/2002 | Jarczynski et al. | |
| 6,452,294 B1 | 9/2002 | Vandervort et al. | |
| 6,465,917 B2 | 10/2002 | Wetzel et al. | |
| 6,495,943 B2 | 12/2002 | Wetzel et al. | |
| 6,617,749 B2 * | 9/2003 | Salamah et al. | 310/270 |
| 6,628,020 B1 | 9/2003 | Tong | |
| 6,720,687 B2 | 4/2004 | Salamah et al. | |

* cited by examiner

*Primary Examiner*—Thanh Lam
(74) *Attorney, Agent, or Firm*—Nixon & Vanderhye, PC

(57) ABSTRACT

Body wedge blocks are provided adjacent the end of the rotor body that have a forward facing axial end that is aerodynamically streamlined. Thus, between adjacent body wedge blocks a flow passage for cooling air is created that allows gradual contraction of the flow from the endwinding region toward the subslot ducts, thereby reducing pressure losses.

18 Claims, 3 Drawing Sheets

STREAMLINED BODY WEDGE BLOCKS AND METHOD FOR ENHANCED COOLING OF GENERATOR ROTOR

BACKGROUND OF THE INVENTION

The present invention relates to a structure and method for enhanced cooling of generator rotors.

The power output rating of dynamoelectric machines, such as large turbo-generators, is often limited by the ability to provide additional current through the rotor field winding because of temperature limitations imposed on the electrical conductor insulation. Therefore, effective cooling of the rotor winding contributes directly to the output capability of the machine. This is especially true of the rotor end region, where direct, forced cooling is difficult and expensive due to the typical construction of these machines. As prevailing market trends require higher efficiency and higher reliability in lower cost, higher-power density generators, cooling the rotor end region becomes a limiting factor.

Turbo-generator rotors typically consist of concentric rectangular coils, which are made of copper turns radially stacked in slots in a rotor body. The end portions of the coils (commonly referred to as endwindings), which are beyond the support of the main rotor body, are typically supported against rotational forces by a retaining ring (see FIG. 1). Blocks are placed intermittently between the concentric coil endwindings to maintain relative positions and to add mechanical stability (see FIG. 2). The blocks are classified as space, spacer, and wedge blocks, depending on their location.

As noted above, efficient cooling is a prime requirement for a good ventilation design. In a typical generator rotor, cold flow from the fan enters into the passage below the centering ring and on to the endwinding region. This flow further divides into groove flow (in grooved endwindings) and sub-slot flow. The wedge blocks which are in the vicinity of the rotor body are referred to as body wedge blocks. The cooling flow that passes beneath and around these blocks enters into the subslot ducts which leads the cooling fluid further downstream into the rotor body. While the rotor is rotating at high speed, flow beneath the coils in the endwinding region travels at a high relative tangential velocity. When flow reaches the vicinity of the subslot ducts, due to the high relative tangential component of velocity, it enters the subslot duct at an angle. This misalignment between the flow and the subslot induces losses at the subslot entrance. Further, when the cooling flow enters into the small subslot ducts from the relatively big endwinding duct, the flow contracts suddenly. This is due to the fact that the subslot ducts are defined perpendicular to the large endwinding duct. The contraction of the flow from the large endwinding duct to the small subslot duct is sudden. The sudden contraction induces additional pressure losses.

BRIEF DESCRIPTION OF THE INVENTION

The present invention proposes a body wedge block configuration to reduce the losses that occur at the entry to a subslot duct to thereby lead to more effective rotor body cooling and, thus, improved over all ventilation efficiency.

In accordance with an example embodiment of the invention, body wedge blocks are provided that have a forward facing axial end that is aerodynamically streamlined, thereby creating between adjacent body wedge blocks a flow passage that allows gradual contraction of the flow as opposed to the sudden contraction with the conventional flat axial end body wedge blocks.

Thus, the invention may be embodied in a gas cooled dynamoelectric machine, comprising: a rotor having a body portion, said rotor having axially extending coils and end turns defining a plurality of endwindings extending axially beyond at least one end of said body portion; and at least one body wedge block located between adjacent said coils adjacent an axial end of said body portion, said body wedge block having first and second sidewall portions generally parallel to the axis of the rotor that engage said adjacent coils, an upstream wall, and a downstream wall, said upstream wall of said body wedge block having an aerodynamic contour having a gradually increasing width from a leading end edge thereof to said sidewall portions.

The invention may also be embodied in a gas cooled dynamoelectric machine, comprising: a rotor having a spindle and a body portion; a rotor winding comprising axially extending coils disposed on said body portion and spaced, concentric endwindings extending axially beyond at least one end of said body portion, said endwindings and said spindle defining an annular space therebetween; a plurality of body wedge blocks located between adjacent said coils, adjacent said rotor body portion; and each said body wedge block having first and second sidewall portions engaging said adjacent coils, an upstream wall, and a downstream wall, said upstream wall of at least one of said body wedge blocks having an aerodynamic contour thereby to reduce pressure losses when cooling flow enters cooling passages beneath said coils in the rotor body portion.

The invention may further be embodied in a method of cooling a generator having a spindle, a body portion, and a rotor winding comprising axially extending coils disposed on said body portion and spaced, concentric endwindings extending axially beyond at least one end of said body portion, said endwindings and said spindle defining an annular space therebetween, the method comprising: disposing a plurality of body wedge blocks between adjacent said coils, adjacent said rotor body portion, each said body wedge block having first and second sidewall portions engaging said adjacent coils, an upstream wall, and a downstream wall, said upstream wall having an aerodynamic contour; and directing cooling air to flow into said annular space and pasted said body wedge blocks into subslot ducts defined in said rotor body below said coils, wherein said aerodynamic contour of said upstream walls of said body wedge blocks gradually contracts said flow into said subslot ducts, thereby to reduce pressure losses.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
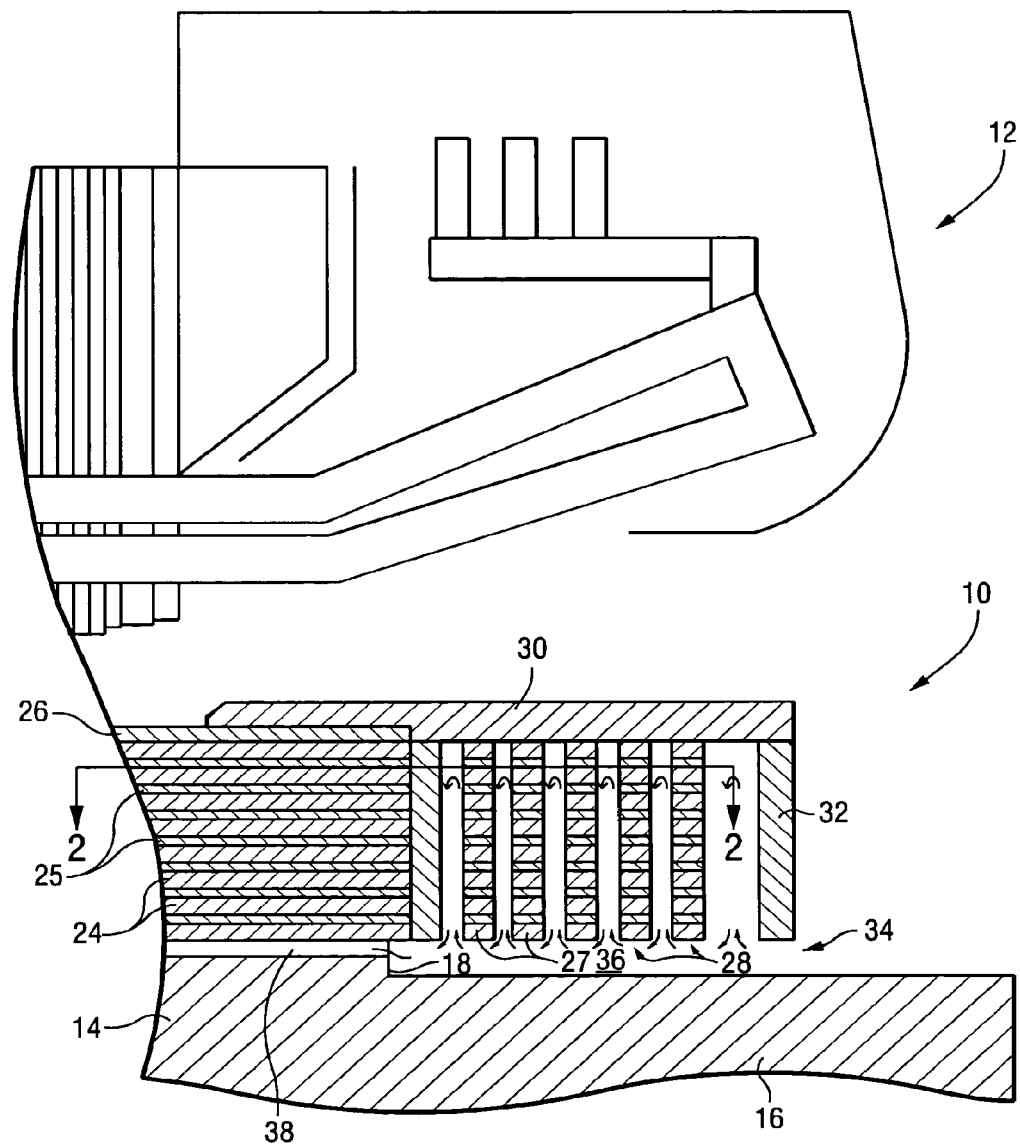
FIG. 1 is a partial, schematic and cross-sectional view of a portion of the end turn region of a dynamoelectric machine rotor with the stator in opposed facing relation thereto.
Figure 2:
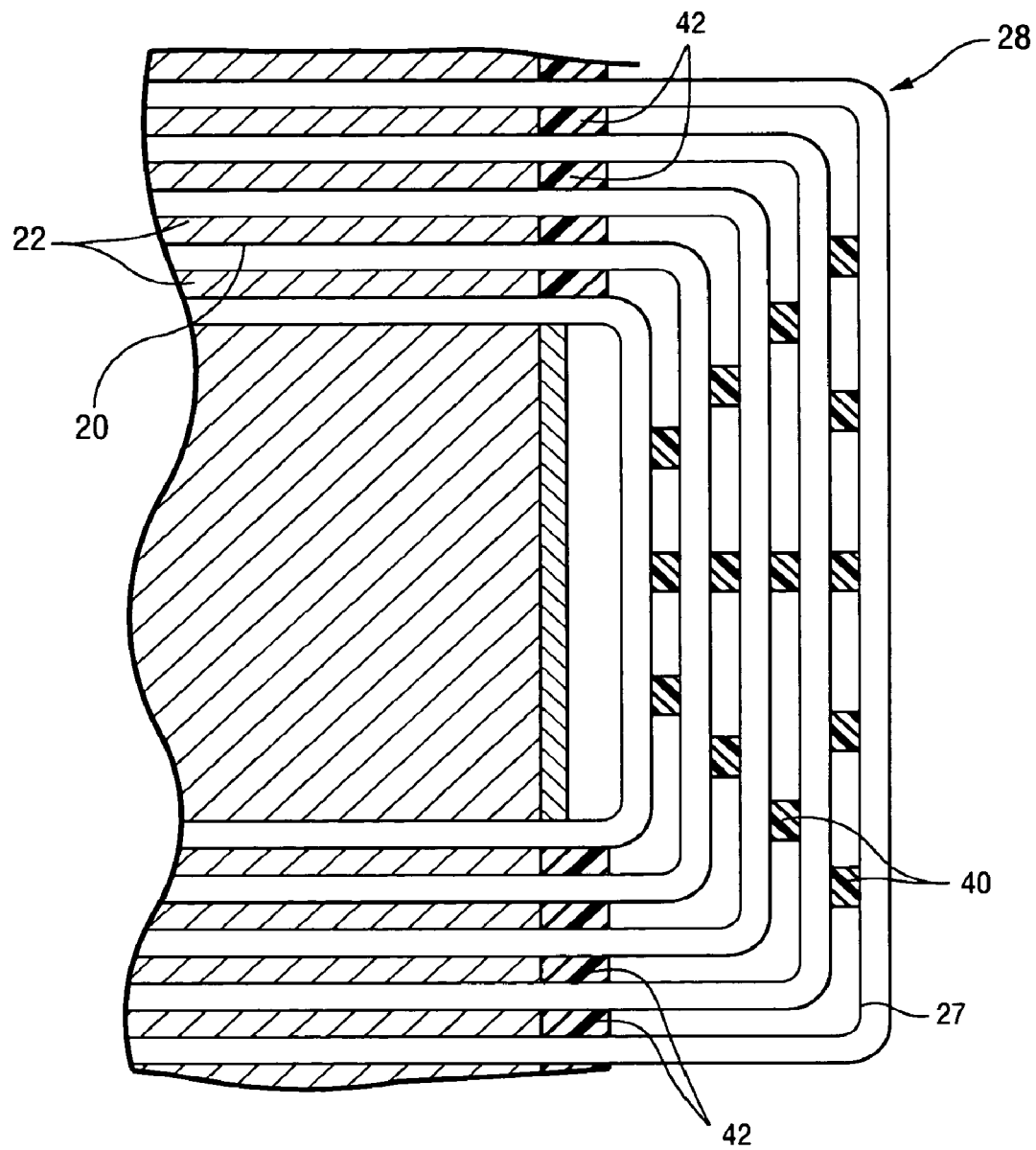
FIG. 2 is a schematic cross-sectional view of the dynamoelectric machine rotor taken along line 2-2 of FIG. 1.

Referring to the drawings wherein identical reference numerals denote the same elements throughout the various views, FIGS. 1 and 2 show a rotor 10 for a gas-cooled dynamoelectric machine, which also includes a stator 12 surrounding the rotor. The rotor includes a generally cylindrical body portion 14 centrally disposed on a rotor spindle 16 and having axially opposing end faces, of which a portion 18 of one end face is shown in FIG. 1. The rotor body portion is provided with a plurality of circumferentially-spaced, axially extending slots 20 for receiving concentrically arranged coils 22, which make up the rotor winding. For clarity, only five rotor coils are shown, although several more are commonly used in practice.

Specifically, a number of conductor bars 24 constituting a portion of the rotor winding are stacked in each one of the slots. Adjacent conductor bars are separated by layers of electrical insulation 25. The stacked conductor bars are typically maintained in the slots by wedges 26 (FIG. 1) and are made of a conductive material such as copper. The conductor bars 24 are interconnected at each opposing end of the body portion by end turns 27, which extend axially beyond the end face of the rotor body portion 14 to form stacked endwindings 28. The end turns are also separated by layers of electrical insulation.

Referring specifically to FIG. 1, a retaining ring 30 is disposed around the end turns at each end of the body portion to hold the endwindings in place against centrifugal forces. The retaining ring 30 is fixed at one end to the body portion 14 and extends out over the rotor spindle 16 to circumferentially encircle the endwinding region. A centering ring 32 is attached to the distal end of the retaining ring 30. It should be noted that the retaining ring 30 and the center ring 32 can be mounted in other ways, as is known in the art. The inner peripheral edge of the centering ring 32 is radially spaced from the rotor spindle 16 so as to form a gas inlet passage 34 and the endwindings 28 are spaced from the spindle 16 so as to define an annular region 36. A number of axial cooling channels or subslot ducts 38 formed along slots 20 are provided in fluid communication with the gas inlet passage 34 via the annular region 36 to deliver cooling gas to the coils 22.

Turning to FIG. 2, the endwindings 28 at each end of the rotor 10 are circumferentially and axially separated by a number of blocks 40, 42. (For clarity of illustration, the blocks are not shown in FIG. 1). The blocks are elongated blocks of an insulating material located in the spaces between adjacent endwindings 28, classified into space blocks and body wedge blocks. The space blocks 40 are illustrated as disposed in the endwinding region to maintain a spacing between the copper endwindings 28. The body wedge blocks 42 are disposed at the end 18 of the rotor body portion 14.

Figure 3:
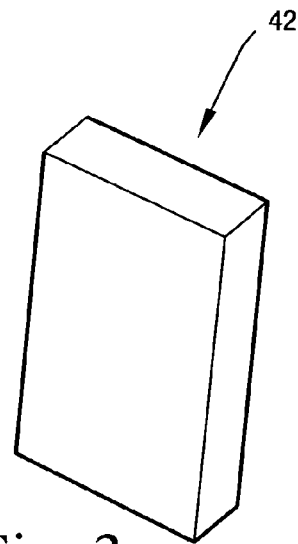
FIG. 3 is a schematic perspective view of a conventional body wedge block.
Figure 4:
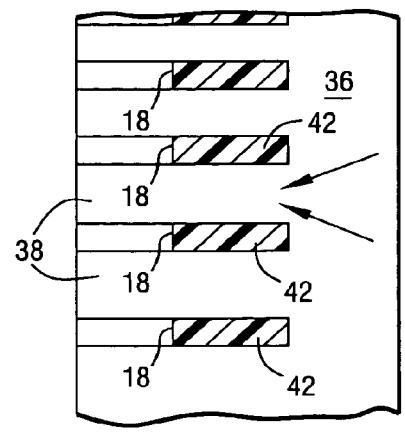
FIG. 4 is a schematic plan view illustrating flow contraction between the endwinding region and the subslot ducts with a conventional body wedge block.

As understood from FIGS. 2, 3 and 4, a conventional body wedge block is substantially rectangular shape in cross-section, provided merely to laterally space the respective copper coils 22 (not shown in FIG. 4). As noted above, there is a sudden flow contraction at the end 18 of the rotor body portion 14 where the cooling air flowing in the endwinding region, e.g. in the endwinding duct 36, transitions to the subslot ducts 38.

As noted above, the subslot ducts 38 are disposed perpendicular to the large endwinding duct 36. When the flow reaches the subslot entrance, due to high tangential velocity, it enters the subslot at an angle. Misalignment of the flow at the subslot entrance causes flow losses in terms of total pressure drop. Furthermore, at the subslot entrance, flow is contracted from the large area duct or flow passage 36 below the endwinding to the small area subslot ducts 38. This leads to sudden contraction of flow which generates high-pressure losses at the subslot entrance.

The present invention provides a body wedge block configured to reduce the losses that occur at the entry to a subslot duct, thereby leading to more effective rotor body cooling.

Figure 5:
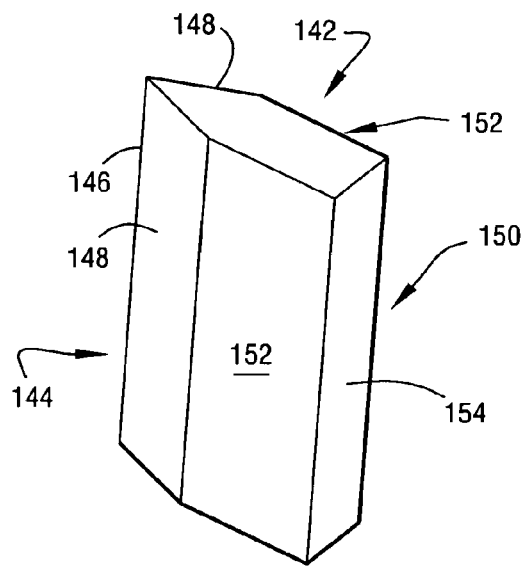
FIG. 5 is a schematic perspective view of a body wedge block embodying the invention.

In an example embodiment of the invention, the leading or front axial end portion of the body wedge block 142 is aerodynamically configured so that a streamlined cooling air flow is created before it enters the subslot ducts downstream of the body wedge blocks 142. In the example illustrated in FIG. 5, the front end portion 144 of the body wedge block 142 is wedge-shaped or triangular in cross-section to define a leading edge apex 146 and inclined wall portions 148 extending from the apex to the full width of the main body 150 of the body wedge block. Thus, the body wedge block includes a main body portion 150 that is generally rectangular having generally planar parallel sidewalls 152 disposed at a right angle to a trailing end 154 thereof and a leading end portion 144 that is aerodynamically configured, triangular in the illustrated embodiment. The body wedge block 142 may be formed in two parts, e.g., a triangular leading end portion 144 and a rectangular main body portion 150 joined together, or may be integrally formed to define the aerodynamic portion and the coil spacing portion. Although in the illustrated embodiment the body wedge block leading end portion 144 is substantially triangular having an apex 146 and straight inclined sides 148, it is to be understood that an alternative would be to provide a more blunted or rounded leading end and continuously convexly curved surfaces leading to the flat coil spacing surfaces 152 of the body wedge block main body 150. In either configuration the leading end portion has an aerodynamic contour with a gradually increasing width from the leading end edge thereof to the main body sidewalls 152.

Figure 6:
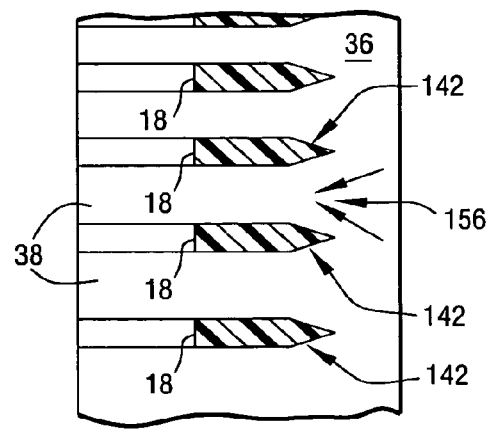
FIG. 6 is a schematic plan view depicting gradual flow contraction between the endwinding region and the subslot ducts with aerodynamically configured body wedge blocks embodying the invention.

The gradually increasing width of the leading end portion 144 of the body wedge block 142 allows flow to gradually contract on to the sides of the body wedge blocks rather than having a flow blocking effect as with the conventional rectangular wedge block of FIGS. 3 and 4. As understood, cooling flow for the rotor body has to pass between an adjacent pair of body wedge blocks. As illustrated in FIG. 6 and as contrasted with FIG. 4, when two aerodynamically shaped blocks 142 are disposed adjacent one another and separated by a copper coil (not shown in FIGS. 4 and 6), a passage 156 is defined below the coil by the respective body wedge blocks that is configured like a convergent nozzle which thus allows flow to contract relatively gradually into subslot duct 38. Gradual contraction as compared to sudden contraction reduces the pressure losses significantly. Further in this regard, the radial height of the body wedge block is advantageously greater than that of the conventional block so that it protrudes well below the coils in the flow to maximize the effect of the newly formed passage 156. The additional increase in height is such that it maintains sufficient clearance between the spindle top radius and the block's lower radius. Thus, this arrangement not only eliminates the blocking of flow at the end of the rotor body but also acts as a guiding channel beneath the coils in the flow path. By acting as a guiding channel, the tangential velocity component of flow at the subslot entrance is reduced and converts into an axial flow component. Ultimately, it gives an additional reduction to the pressure drop.

The redesigned body wedge blocks 142 embodying the invention are applicable to all air-cooled and hydrogen-cooled generators. They will lead to less flow losses and hence more ventilation efficiency of the generators. The overall efficiency of a generator will also increase as it is a function of ventilation efficiency, so that the cost of electricity is ultimately reduced for the end consumers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas cooled dynamoelectric machine, comprising:
    a rotor having a body portion, said rotor having axially extending coils and end turns defining a plurality of endwindings extending axially beyond at least one end of said body portion; and
    at least one body wedge block located between adjacent said coils adjacent an axial end of said body portion, said body wedge block having first and second sidewall portions generally parallel to the axis of the rotor that engage said adjacent coils, an upstream wall, and a downstream wall, said upstream wall of said body wedge block having an aerodynamic contour having a gradually increasing width from a leading end edge thereof to said sidewall portions.

2. The dynamoelectric machine of claim 1, wherein said upstream wall has an apex and first and second inclined wall portions extending from said apex to said sidewall portions.

3. The dynamoelectric machine of claim 2, wherein said apex is disposed at a substantial lateral midpoint of said upstream wall.

4. The dynamoelectric machine of claim 2, wherein said inclined wall portions are each substantially planar.

5. The dynamoelectric machine of claim 1, wherein said body wedge block is comprised of a generally rectangular main body portion and a leading end portion, said main body portion defining said downstream wall and said sidewall portions, and said leading end portion defining said upstream wall.

6. The dynamoelectric machine of claim 5, wherein said upstream wall has an apex and first and second inclined wall portions extending from said apex to said sidewall portions.

7. The dynamoelectric machine of claim 6, wherein said apex is disposed at a substantial lateral midpoint of said upstream wall.

8. The dynamoelectric machine of claim 5, wherein said inclined wall portions are each substantially planar.

9. The dynamoelectric machine of claim 5, wherein said leading end portion is integrally formed with said main body portion.

10. A gas cooled dynamoelectric machine, comprising:
    a rotor having a spindle and a body portion;
    a rotor winding comprising axially extending coils disposed on said body portion and spaced, concentric endwindings extending axially beyond at least one end of said body portion, said endwindings and said spindle defining an annular space therebetween;
    a plurality of body wedge blocks located between adjacent said coils, adjacent said rotor body portion; and
    each said body wedge block having first and second sidewall portions engaging said adjacent coils, an upstream wall, and a downstream wall, said upstream wall of at least one of said body wedge blocks having an aerodynamic contour thereby to reduce pressure losses when cooling flow enters cooling passages beneath said coils in the rotor body portion.

11. The dynamoelectric machine of claim 10, wherein said upstream wall has an apex and first and second inclined wall portions extending from said apex to said sidewall portions.

12. The dynamoelectric machine of claim 11, wherein said apex is disposed at a substantial lateral midpoint of said upstream wall.

13. The dynamoelectric machine of claim 11, wherein said inclined wall portions are each substantially planar.

14. The dynamoelectric machine of claim 10, wherein said at least one body wedge block is comprised of a generally rectangular main body portion and a leading end portion, said main body portion defining said downstream wall and said sidewall portions, and said leading end portion defining said upstream wall.

15. The dynamoelectric machine of claim 14, wherein said upstream wall has an apex and first and second inclined wall portions extending from said apex to said sidewall portions.

16. The dynamoelectric machine of claim 15, wherein said apex is disposed at a substantial lateral midpoint of said upstream wall.

17. The dynamoelectric machine of claim 15, wherein said inclined wall portions are each substantially planar.

18. The dynamoelectric machine of claim 14, wherein said leading end portion is integrally formed with said main body portion.

* * * * *